(12) United States Patent
Talvitie

(10) Patent No.: US 6,791,491 B2
(45) Date of Patent: Sep. 14, 2004

(54) METHOD FOR REDUCING INTERFERENCE IN A RECEIVER AND AN ELECTRONIC DEVICE

(75) Inventor: Olli Talvitie, Tampere (FI)

(73) Assignee: Nokia Corporation, Espoo (FI)

(*) Notice: Subject to any disclaimer, the term of this patent is extended or adjusted under 35 U.S.C. 154(b) by 65 days.

(21) Appl. No.: 10/128,614

(22) Filed: Apr. 23, 2002

(65) Prior Publication Data

US 2002/0158793 A1 Oct. 31, 2002

(30) Foreign Application Priority Data

Apr. 27, 2001 (FI) .............................. 20010891

(51) Int. Cl.⁷ ................................. G01S 5/14
(52) U.S. Cl. ............ 342/357.02; 342/159; 342/357.01; 342/357.06
(58) Field of Search ....................... 342/357.01, 357.02, 342/357.03, 357.06, 357.1, 357.12, 357.16, 159; 455/404.2, 456.5, 456.6

(56) References Cited

U.S. PATENT DOCUMENTS

| | | | |
|---|---|---|---|
| 4,952,193 A | | 8/1990 | Talwar .................. 455/63 |
| 5,223,843 A | * | 6/1993 | Hutchinson ............. 342/352 |
| 5,584,065 A | | 12/1996 | Monzello ............... 455/296 |
| 6,107,960 A | | 8/2000 | Krasner ............... 342/357.09 |
| 6,182,011 B1 | * | 1/2001 | Ward ..................... 701/213 |

FOREIGN PATENT DOCUMENTS

| | | |
|---|---|---|
| EP | 1 032 135 A2 | 8/2000 |
| EP | 1 091 497 A1 | 4/2001 |
| EP | 1091497 A1 | 4/2001 |
| WO | WO 96/15596 | 5/1996 |
| WO | WO 01/06669 A1 | 1/2001 |
| WO | WO 01/20795 | 3/2001 |

OTHER PUBLICATIONS

Krasner, "Reducing Cross–Interference in a Combined GPS Receiver and Communication System", PCT WO 99/36795, Jul. 22, 1999, Snaptrack, Inc, 28 pages.*

* cited by examiner

Primary Examiner—Thomas H. Tarcza
Assistant Examiner—Isam Alsomiri
(74) Attorney, Agent, or Firm—Perman & Green, LLP

(57) ABSTRACT

The invention relates to a method for attenuating interference in a positioning receiver of an electronic device, in which method a signal transmitted by satellites of a positioning system is received through a second antenna. The electronic device further comprises at least a mobile station and a first antenna to be used at least as a transmission antenna of the mobile station. In the method the strength of at least one interference signal generated in the electronic device is determined, a compensation signal corresponding to the strength of the determined interference signal is produced, and said compensation signal is combined to a signal received through a second antenna. The combined signal is directed to the positioning receiver.

14 Claims, 3 Drawing Sheets

METHOD FOR REDUCING INTERFERENCE IN A RECEIVER AND AN ELECTRONIC DEVICE

FIELD OF THE INVENTION

The present invention relates to a method for attenuating interference in a positioning receiver of an electronic device, in which a signal transmitted by satellites of a positioning system is received through a second antenna, and which electronic device further comprises at least a mobile station and a first antenna to be used at least as a transmitting antenna for the mobile station. The invention also relates to an electronic device, which comprises at least a mobile station, a first antenna to be used at least as the transmitting antenna of the mobile station, a positioning receiver, a second antenna for receiving a signal transmitted by satellites of a positioning system to the positioning receiver, and means for attenuating interference.

BACKGROUND OF THE INVENTION

Devices are known in which a positioning receiver is used for determining the location of the device. Such positioning receivers are primarily based on satellite-based positioning systems. In such satellite-based positioning systems the positioning receiver attempts to receive a signal transmitted by satellites and containing phase-modulated information, inter alia the orbital parameters of satellites. In practice, however, the signal strength in the positioning receiver may be so attenuated, particularly indoors, that signal detection is difficult, and positioning cannot always be performed.

One known positioning system is the GPS system (Global Positioning System), which comprises more than 30 satellites, of which usually a maximum of 12 are simultaneously within the sight of a receiver. These satellites transmit e.g. Ephemeris data of the satellite, as well as time data of the satellite. The receiver used in the positioning normally determines its position by computing the propagation time of a plurality of signals transmitted substantially simultaneously from several satellites belonging to the positioning system to the receiver. For positioning, the receiver must typically receive signals of at least four satellites within sight, to be able to compute the position.

Each operating satellite of the GPS system transmits a so-called L1 signal at the carrier frequency of 1575.42 MHz. This frequency is also indicated with 154 $f_0$, where $f_0$=10.23 MHz. Furthermore, the satellites transmit another ranging signal at a carrier frequency of 1227.6 MHz called L2, i.e. 120 $f_0$. The carrier frequency of the L1 signal is further modulated by navigation information at a bit rate of 50 bit/s. The navigation information comprises information about the "health" and orbit of the satellite, parameters related to the local clock of the satellite, etc. In satellites of the GPS system, e.g. so-called atomic clocks are used as the local clock.

There are devices under development that have both a positioning receiver and means for performing mobile station functions, wherein an object of the device is both to perform positioning and to use the device as a mobile station. Typically, a frequency range at the frequency of 900 MHz, 1800 MHz and/or 1900 MHz has been allocated for the use of mobile communication systems. Some devices can be connected to two or even three mobile communication systems operating at different frequencies.

Particularly the transmitter of the mobile station generates strong signals at the frequency range of the mobile communication system and also at harmonic frequencies. This interference signal is broadband to such a degree that it raises the noise level of the frequency range used in the positioning. For example a GSM transmission produces a primary transmission signal $f_{GSM}$ and an interfering signal $f_{GSMnoise}$. Broadband noise caused by a GSM transmission is illustrated in FIG. 1, where it can be seen that the broadband noise produced at GSM 1800 is most significant to the GPS band. Other noise that is disturbing in view of the GPS positioning receiver includes for example such interfering frequencies caused by a GSM transmission that arrive at a GPS band. These noise signals are connected particularly via the antenna of the mobile station to the antenna of the positioning receiver, but some of them can also be connected inside the device.

Therefore, the reception of signals from satellites in a positioning system is most difficult during the transmission of the mobile station. Even if an aim has been to implement the structure of the device in a manner that such interference signals would not spread into the surrounding space, the device may also, to some extent, radiate interference signals into its close vicinity. It is also problematic to attenuate such interference signals inside the device itself. In this case, in a prior art device the interference radiation enters the positioning receiver, wherein the positioning receiver is not necessarily capable of detecting weak signals transmitted by satellites, and the positioning fails. Sufficient attenuation of interference radiation is difficult with different radiation shields and earthing arrangements inside the device itself, and in many cases this would require increasing the size of the device. In some prior art devices an aim has been to solve this problem in a manner that the positioning receiver is not in operative state when the mobile station is operating. This causes problems in practical use, because the user must turn off the mobile station in order to perform positioning. In a corresponding manner, the user must turn off the positioning receiver when he/she switches on the mobile station. Since particularly weak signal strength causes that the positioning often takes a long time, even several minutes, usability of such a device is not particularly good.

In some cases, the positioning of a mobile station can be performed by using the mobile station and base stations of a mobile communication network, in case the service provider of the mobile communication system has introduced this kind of service. Thus, this system is dependent on the service provider and therefore not a general solution to the positioning problem. Another aspect that could be mentioned about such a solution is that even if the service were available in a mobile communication network of a mobile communication service provider, the service provider may charge for the use of the service. The user does not necessarily want to pay for using such a system.

In some countries it has been or will be made compulsory to provide the mobile station with the function whereby it can be positioned, particularly during an emergency call. In this case the mobile station must not be switched off while performing positioning. In practice, this means that when placing an emergency call, the positioning in a prior art system should be performed by using a mobile communication network, which, as has been mentioned, is not always possible.

SUMMARY OF THE INVENTION

An aim of the present invention is to implement an improved method for reducing interference occurring in an electronic device, in a positioning receiver located in the electronic device and used in the positioning. The invention is based on the idea that a compensation signal is formed of signals generated in the electronic device and causing interference in the positioning receiver, such as a signal generated by a transmitter, which compensation signal is transmitted to the positioning receiver as substantially reverse phased relative to the signal formed by the transmitter in a manner that the compensation signal attenuates the effect of the signal formed by the transmitter in the positioning receiver to a significant extent. To be exact, the method according to the present invention is primarily characterized in that in the method, the strength of at least one interference signal formed in the electronic device is determined, a compensation signal corresponding to the strength of the determined interference signal is formed, and said compensation signal is combined with a signal received through a second antenna, which combined signal is directed to the positioning receiver. The electronic device according to the present invention is primarily characterized in that means for attenuating interference comprise means for determining at least the strength of one interference signal formed in the electronic device, means for forming a compensation signal corresponding to the strength of the determined interference signal, and means for forming a combined signal by combining said compensation signal with a signal received through the second antenna, and means for directing the combined signal to a positioning receiver.

The present invention shows remarkable advantages compared to solutions of prior art. By using a method according to the invention, the influence of the radiation caused by the transmitter to the operation of the positioning receiver can be attenuated to a significant degree, wherein the positioning receiver can be kept operative also when the mobile station is not operative. In this case, the user can for example during a call examine his/her location and, if necessary, keep track on the changes in his/her location. Thus, the user can transmit his/her positioning data through a telephone call to the person with whom he/she is speaking, who can e.g. give driving directions to a certain location. In addition, from the electronic device in accordance with an advantageous embodiment of the invention, positioning data can be automatically transmitted e.g. during an emergency call, wherein it is easier and faster to direct help to the correct location than when prior art solutions are used.

DESCRIPTION OF THE DRAWINGS

In the following, the invention will be described in more detail with reference to the appended drawings, in which.

DETAILED DESCRIPTION OF THE INVENTION

In the following, the invention will be exemplified by an electronic device 1 illustrated in FIG. 2 and comprising a mobile station 2 and a positioning receiver 3. The mobile station 2 is e.g. a mobile station belonging to the GSM system and using a frequency range of 900 MHz. The positioning receiver 3 is e.g. a receiver applicable for receiving signals transmitted by satellites of the GPS system. This kind of positioning receiver usually comprises a plurality of transmission channels, wherein a signal transmitted by more than one satellite can be received simultaneously, which can expedite the positioning. However, it is obvious that the invention can also be adapted in connection with other systems than the GSM and GPS systems.

Figure 1:
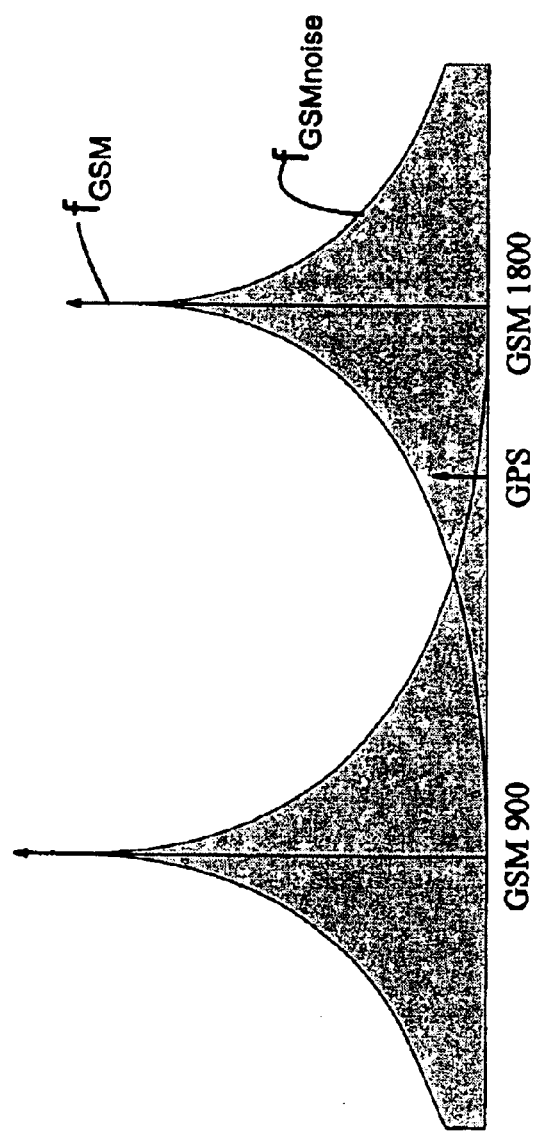
FIG. 1 shows, in a frequency function, an exemplary situation in which interference appears.
Figure 2:
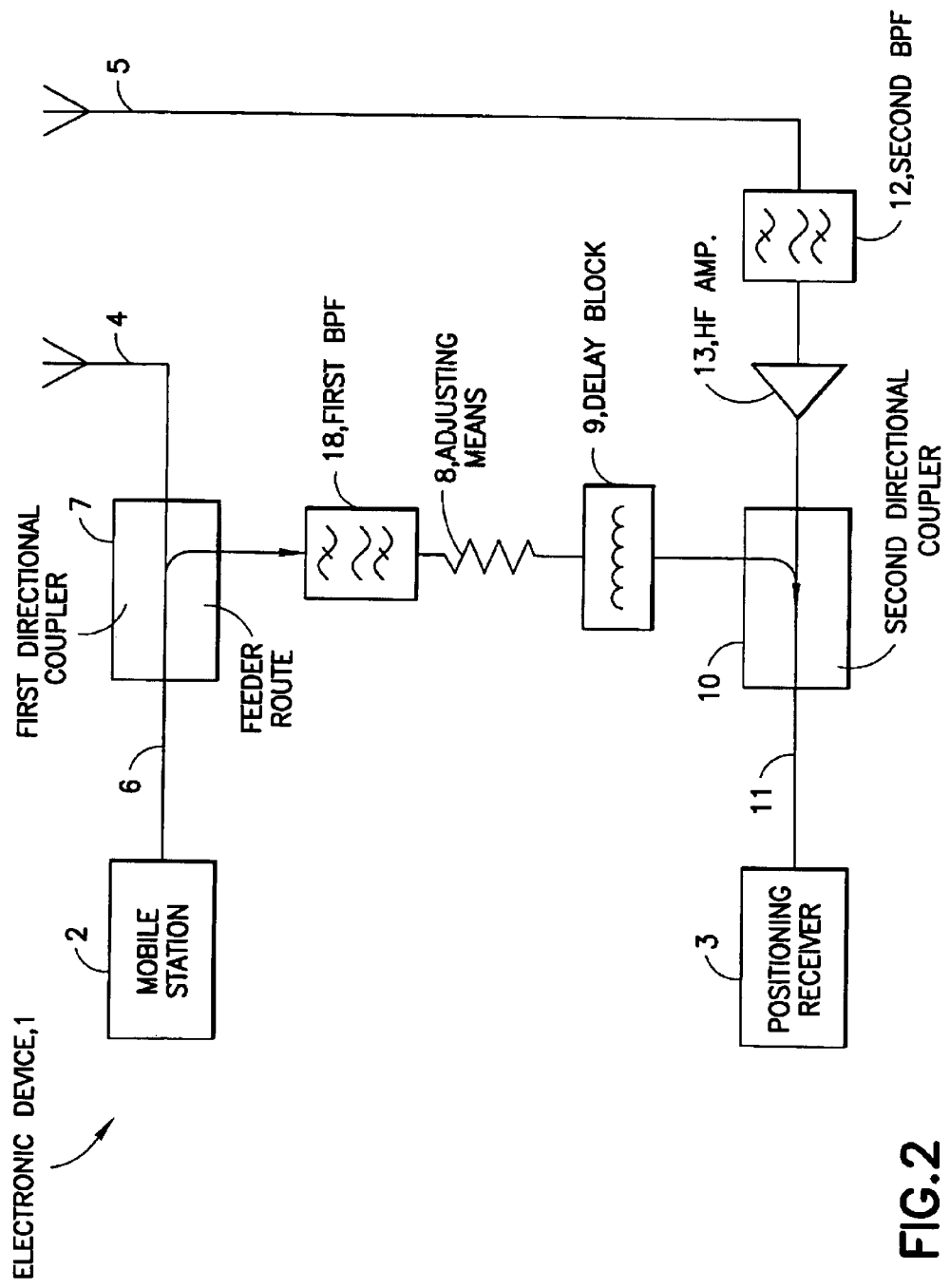
FIG. 2 shows interference attenuation adapted in an electronic device according to a preferred embodiment of the invention in a reduced block chart.

FIG. 2 shows in more detail a switching in an electronic device 1 implementing the method according to a preferred embodiment of the invention in a reduced manner. The electronic device 1 comprises a separate antenna for the mobile station 2 and the positioning receiver 3. A first antenna 4 is used as a transmitting and receiving antenna of the mobile station. In a corresponding manner, a second antenna 5 is used as the receiving antenna of the positioning receiver 3. The mobile station is connected with a feeder route 6 to the first antenna 4. A first directional coupler 7 is also connected to this feeder route 6. In this case, when the mobile station 2 is transmitting, a part of the signal directed to the first antenna 4 is directed through the first directional coupler 7 to a first bandpass filter 18. The bandpass of this first bandpass filter 18 is set to the band of the signals used in the positioning. In this situation, the input of the first bandpass filter 18 comprises substantially only such signals initiated in the mobile station whose frequency is in said bandpass. These signals are further directed to an adjusting means 8. The purpose of this adjusting means 8 is to adjust the strength of the transmission signal taken via the directional coupler. From the adjusting means 8 the signal is further directed to a delay block 9, wherein the signal is delayed in order to produce an appropriate phase shift. The phase-shift signal is further directed to a second directional coupler 10, which is placed to the antenna line 11 of the positioning receiver 3.

The satellite signals are received with the second antenna 5, where-after a bandpass filtering is carried out in a second bandpass filter 12. The bandpass of this second bandpass filter is adjusted to the frequency range of the satellite signals. In an ideal situation, the second bandpass filter 12 is passed only by these signals on this frequency range, but in practice a part of the signals outside this frequency range can pass through the second bandpass filter 12, although attenuated. The second bandpass filter 12 cannot differentiate the signal source, wherein even such signals that are located in said frequency area and derive from elsewhere than a satellite can pass through the second bandpass filter 12. In this case, for example signals located on harmonious frequencies of the mobile station's transmitter can reach to the positioning receiver 3. From the second bandpass filter 12 the signals are directed to a high-frequency amplifier 13, in which the signals are amplified. Thereafter the signals that are received through the second antenna, filtered and amplified are connected in a second directional coupler 10 to a signal coming via a delay block 9.

The attenuation of the adjustment means 8 is adjusted in a manner that the transmission signal of the mobile station in the output of the adjustment means is of the same order as the transmission signal of the mobile station influencing in the second directional coupler 10 and received via the second antenna, which transmission signal is, accordingly, interference signal in view of the positioning receiver. In a corresponding manner, the phase shift of the delay block 9 is adjusted in a manner that the signal coming via the delay block 9 is substantially in a phase that is reverse relative to the transmission signal of the mobile station affecting in the second directional coupler 10. In an ideal situation, the signal taken with the first directional coupler 6 will as a consequence cancel the transmission signal received via the second antenna, i.e., the interference can be eliminated almost entirely. However, in practice the conditions can change during the use of the electronic device 1 and the adjustment values do not necessarily correspond entirely to an ideal situation. Nevertheless, such interference caused by a mobile station can be significantly attenuated, wherein they do not significantly interfere with the operation of the positioning receiver.

The correct attenuation value for the adjustment block 8 and delay for the delay block 9 can be determined experimentally when the electronic device 1 is manufactured. Thus, advantageously a test environment is used in which access of external radio frequency signals to the second antenna 5 can be eliminated. By setting the mobile station 2 to transmit a signal, it is possible to measure from the input of the positioning receiver (or from the output of the second directional coupler 10) the strength of the mobile station's signal and timing and to use these measured values for setting the parameters of the adjustment block 8 and the delay block 9.

The adjustment block 8 can be implemented for example by using a high-frequency amplifier (not shown) whose amplification can be adjusted. The adjustment element can be for example a resistance having a resistance value that can be adjusted to change the amplification of the high-frequency amplifier. The delay block 9 can be implemented for example by using delay lines.

Interference caused by the transmitter of a mobile station and summed with the signal received by the positioning receiver is usually interference that cannot be predicted. However, the invention can be applied in the attenuation of such interference that can, to a great extent, be predicted. The display is one possible cause of such interference. Thus, the above-described principles can also be applied for compensating interference caused by some other components of the electronic device 1, preferably interference that is predictable and/or measurable. For example the display, buses (not shown), processors 14a, 14b, memory means 15a, 15b can cause signals that interfere with the operation of the positioning receiver 3. To perform compensation, such interference signal is measured, and a signal that is substantially equal in size but substantially reverse-phased is generated and combined for example to an antenna signal in the second directional coupler 10.

The method according to the invention can be applied also in a manner that the compensation is performed for example in the processor 14b of the positioning receiver 3, such as a digital signal-processing unit. A preferred example of such an electronic device 1 is illustrated in reduced manner in FIG. 3. According to this embodiment, the signals are received in the positioning receiver 3 of the electronic device and sampled (digitized) in a first analog/digital converter 16, in a manner known as such. In addition, samples are taken of the mobile station's transmission signal for example by using the first directional coupler 6, these being sampled in the analog/digital converter 17. After the signal received through the second antenna 5 and the transmission signal of the mobile station are sampled, it is possible to differentiate the derived share of interference signals from the signal received through the second antenna preferably in a filter 14b, where the sampled signals are directed. A little time is required for performing the compensation calculation, but this is usually not significant since the positioning calculation does not have to take place in real time like the functions of the mobile station.

Figure 3:
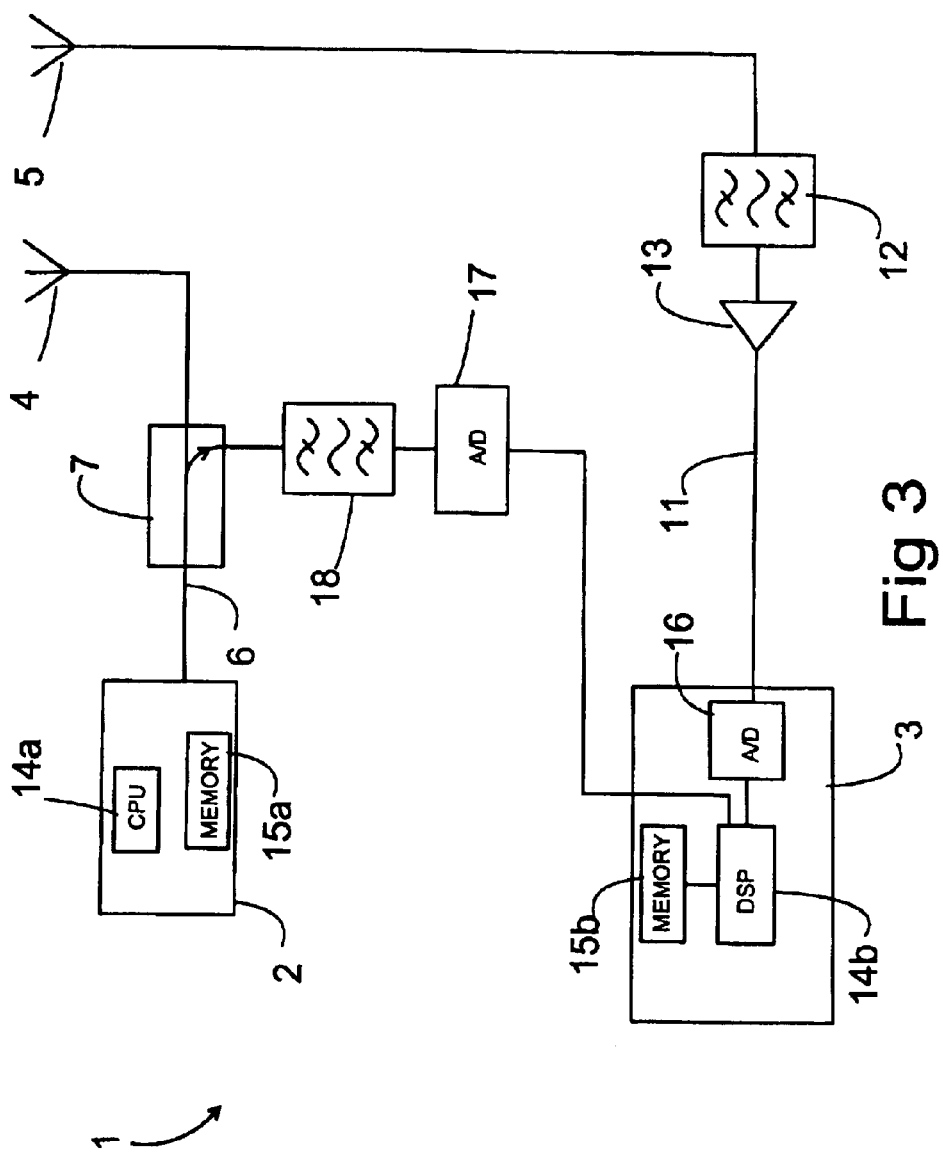
FIG. 3 shows interference attenuation adapted in an electronic device according to a second preferred embodiment of the invention in a reduced block chart.

FIGS. 2 and 3 illustrate mainly the blocks substantial for the present invention. However, it is obvious that in practical embodiments the electronic devices can comprise also other functional blocks than those illustrated in the figures. In addition, practical embodiments of the mobile station 2 and the positioning receiver 3 can vary, but this is not essential for applying the present invention.

It is obvious that the present invention is not limited solely to the above-presented embodiments, but it can be modified within the scope of the appended claims.

What is claimed is:

1. A method for attenuating interference in a positioning receiver of an electronic device, in which a signal transmitted by satellites of a positioning system is received via a second antenna, and which electronic device further comprises at least a mobile station and a first antenna to be used at least as a transmission antenna of the mobile station, wherein the strength of at least one interference signal generating in the electronic device is determined, a compensation signal corresponding to the strength of the determined interference signal is generated, and said compensation signal is combined to the signal to be received through the second antenna, which combined signal is directed to the positioning receiver, a band pass filtering is performed on said at least one interference signal generating in the electronic device for forming said compensation signal, and adjusting the pass band of said band pass filtering at the frequency band of the signal to be received through the second antenna.

2. The method according to claim 1, wherein the phase of at least one said signal is determined, wherein the phase of said compensation signal is set substantially reverse relative to said at least one signal.

3. The method according to claim 1, wherein said combined signal is formed by reducing said compensation signal from said signal received through said second antenna.

4. The method according to claim 1, wherein said combined signal is formed by summing said compensation signal to said signal received through said second antenna.

5. The method according to claim 1, wherein the strength of said at least one interference signal is determined according to the signal transmitted by the mobile station.

6. The method according to claim 1, wherein said at least one interference signal is sampled, said signal received through the second antenna is sampled, and the combined signal is mathematically formed from said sampled signals.

7. An electronic device comprising at least a mobile station, a first antenna to be used at least as a transmission antenna of the mobile station, a positioning receiver, a second antenna for receiving a signal transmitted by satellites of a positioning system to the positioning receiver, and means for attenuating interference, wherein the means for attenuating interference comprise means for determining the strength of at least one interference signal generated in the electronic device, means for forming a compensation signal corresponding to the strength of the determined interference signal, means for forming a combined signal by combining said compensation signal to the signal received through the second antenna, means for directing the combined signal to the positioning receiver, a band pass filter for filtering said at least one interference signal generated in the electronic device for forming said compensation signal, and means for adjusting the pass band of said band pass filter at the frequency band of the signal to be received through the second antenna.

8. The electronic device as set forth in claim 7, comprising means for determining the phase of at least one signal, and means for setting the phase of said compensation signal substantially reverse relative to said at least one phase of the signal.

9. The electronic device according to claim 8, wherein the means for generating the combined signal comprise a directional coupler for deducting said compensation signal from said signal received through said second antenna.

10. The electronic device according to claim 8, wherein the means for generating the combined signal comprise a directional coupler for summing said compensation signal and said signal received through said second antenna.

11. The electronic device according to claim 7, wherein the means for generating the combined signal comprise a directional coupler for deducting said compensation signal from said signal received through said second antenna.

12. The electronic device according to claim 7, wherein the means for generating the combined signal comprise a directional coupler for summing said compensation signal and said signal received through said second antenna.

13. The electronic device according to claim 7, wherein the signal transmitted by the mobile station is used in the determination of the strength of said at least one interference signal.

14. The electronic device according to claim 7, comprising means for sampling said at least one interference signal, means for sampling the signal received through said second antenna, and means for mathematically forming said combined signal from said sampled signals.

* * * * *